(12) United States Patent
Wu et al.

(10) Patent No.: US 12,181,212 B2
(45) Date of Patent: Dec. 31, 2024

(54) PROMPT METHOD AND DEVICE FOR REFRIGERATOR AND REFRIGERATOR

(71) Applicants: QINGDAO HAIGAO DESIGN & MANUFACTURING CO., LTD., Shandong (CN); HAIER SMART HOME CO., LTD., Shandong (CN)

(72) Inventors: Jian Wu, Shandong (CN); Shu Zhou, Shandong (CN); Zhiqun Feng, Shandong (CN); Zhaojun Fei, Shandong (CN); Zuowei Yi, Shandong (CN)

(73) Assignees: QINGDAO HAIGAO DESIGN & MANUFACTURING CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 794 days.

(21) Appl. No.: 17/311,739

(22) PCT Filed: Nov. 12, 2020

(86) PCT No.: PCT/CN2020/128383
§ 371 (c)(1),
(2) Date: Jun. 8, 2021

(87) PCT Pub. No.: WO2021/135669
PCT Pub. Date: Jul. 8, 2021

(65) Prior Publication Data
US 2022/0325944 A1 Oct. 13, 2022

(30) Foreign Application Priority Data
Dec. 31, 2019 (CN) .......................... 201911407743.X

(51) Int. Cl.
*F25D 29/00* (2006.01)
*G05B 19/042* (2006.01)

(52) U.S. Cl.
CPC ........... *F25D 29/00* (2013.01); *G05B 19/042* (2013.01); *G05B 2219/2654* (2013.01)

(58) Field of Classification Search
CPC .... F25D 29/00; F25D 2500/06; F25D 29/003; F25D 2600/02; G05B 19/042;
(Continued)

(56) References Cited

U.S. PATENT DOCUMENTS

2005/0258961 A1* 11/2005 Kimball ............... G06Q 20/203
340/572.1
2006/0178947 A1* 8/2006 Zsigmond .............. G06Q 40/04
705/37
(Continued)

FOREIGN PATENT DOCUMENTS

| CN | 102142058 | 8/2011 |
|---|---|---|
| CN | 105423698 | 3/2016 |

(Continued)

OTHER PUBLICATIONS

International Search Report from PCT/CN2020/128383 dated Feb. 7, 2021.
(Continued)

*Primary Examiner* — A. Hunter Wilder
(74) *Attorney, Agent, or Firm* — Westbridge IP LLC

(57) ABSTRACT

The present application belongs to the technical field of intelligent household appliances, and relates to a prompt method for a refrigerator. The method comprises establishing a dish database according to the menu query information of the user, wherein the dish database comprises dishes and foods corresponding to the dishes; establishing a food database according to each food in the refrigerator and the time when the food enters the refrigerator; detecting food in the current refrigerator, wherein each food in the refrigerator is matched with a corresponding dish according to a dish
(Continued)

database, and prompt information is obtained according to the time when the food enters the refrigerator in the food database; and prompting with the prompt information; wherein the prompt information includes expected expiration times and recommended dishes.

8 Claims, 1 Drawing Sheet

(58) Field of Classification Search
CPC ............ G05B 2219/2654; G06F 16/00; G06F 16/903; G06F 16/9038
See application file for complete search history.

(56) References Cited

U.S. PATENT DOCUMENTS

| | | | |
|---|---|---|---|
| 2008/0250797 A1* | 10/2008 | Rozendaal | ............... F25D 29/00 62/130 |
| 2016/0086146 A1 | 3/2016 | Brown | |
| 2018/0106523 A1* | 4/2018 | Besore | ................. G05B 19/042 |

FOREIGN PATENT DOCUMENTS

| | | | | |
|---|---|---|---|---|
| CN | 105868808 | | 8/2016 | |
| CN | 106372258 | | 2/2017 | |
| CN | 106871567 | A | 6/2017 | |
| CN | 109960689 | | 7/2019 | |
| CN | 110516769 | A * | 11/2019 | ......... G06K 17/0022 |
| JP | 2001165554 | A | 6/2001 | |
| KR | 20160000931 | | 1/2016 | |
| WO | 2018023445 | A1 | 2/2018 | |

OTHER PUBLICATIONS

International Preliminary Report on Patentability dated Jul. 5, 2022.
First Office Action issued in counterpart Chinese Patent Application No. 201911407743.X, dated Mar. 23, 2023.
Refusal Decision issued in counterpart Chinese Patent Application No. 201911407743.X, dated Nov. 14, 2023.
Second Office Action issued in counterpart Chinese Patent Application No. 201911407743.X, dated Aug. 11, 2023.

* cited by examiner

PROMPT METHOD AND DEVICE FOR REFRIGERATOR AND REFRIGERATOR

CROSS-REFERENCE TO RELATED APPLICATIONS

The present application is the national stage entry of PCT/CN2020/128383, filed on Nov. 12, 2020 which was filed on the basis of and claims the benefit of Chinese Patent Application No. 201911407743.X, filed on Dec. 31, 2019, both of which are incorporated herein by reference in their entirety.

TECHNICAL FIELD

The present application relates to the technical field of intelligent household appliances, in particular to a prompt method and device for a refrigerator and the refrigerator.

BACKGROUND

Smart home has become an important part of family informatization and social informatization, more and more traditional household appliances have expanded the market of smart home. At present, with the universal use of smart home appliances, the functional requirements of smart home appliances have become more and more intelligent. For example, the refrigerator, food stored in the refrigerator, the user often forgets the storage time and what food is in the refrigerator, and the shelf life of each food is unclear, resulting in the food becoming stale, and there might also be a case that the food is still stored in the refrigerator although the shelf life thereof has expired, making it difficult for the user to get an effective prompt.

In implementing embodiments of the disclosure, it has been found that there are at least the following problems in the related art: the current refrigerator does not monitor stored food, and does not prompt shelf life to a user.

SUMMARY

The following presents a simplified summary in order to provide a basic understanding of some aspects of the disclosed embodiments. The summary is not an extensive overview, nor is it intended to identify key/critical elements or to delineate the scope of the embodiments, but rather as a prelude to the detailed description that follows.

The embodiment of the present application provides a prompt method and device for a refrigerator and the refrigerator, and aims to solve the problem that information about the food in the refrigerator is difficult to know in time.

In some embodiments, the prompt method for a refrigerator includes:

establishing a dish database according to menu query information of a user, wherein the dish database comprises dishes and foods corresponding to the dishes;

establishing a food database according to each food in the refrigerator and the time when the food enters the refrigerator;

detecting food in a current refrigerator, wherein each food in the refrigerator is matched with a corresponding dish according to a dish database, and prompt information is obtained according to the time when the food enters the refrigerator in the food database; and prompting with the prompt information; the prompt information includes an expected expiration time and recommended dishes.

In some embodiments, the prompt device for a refrigerator includes: a processor configured to execute the aforementioned prompt method for the refrigerator when executing the program instructions, and a memory storing the program instructions.

In some embodiments, the refrigerator includes a prompt device as described above for the refrigerator.

The prompt method and device for the refrigerator and the refrigerator provided by the embodiment of the present application can realize the following technical effects: on the basis of the established dish database and the food database, prompt information can be sent to a user in time, the food is monitored, the storage time is recorded, the user is reminded before the shelf life is expired, and the menu is pushed, so that the time for storing the food in the refrigerator cannot be wasted due to the fact that the shelf life is expired too long, the refrigerator is more intelligent, and more comfortable experience is brought to the user.

The foregoing general description and the following description are exemplary and explanatory only and are not restrictive of the present application.

BRIEF DESCRIPTION OF THE DRAWINGS

One or more embodiments are illustrated by way of example in the accompanying drawings, which do not constitute a limitation on the embodiments, and in which elements having the same reference numeral designations are shown as similar elements and which are not to scale, and in which.

DETAILED DESCRIPTION

Figure 1:
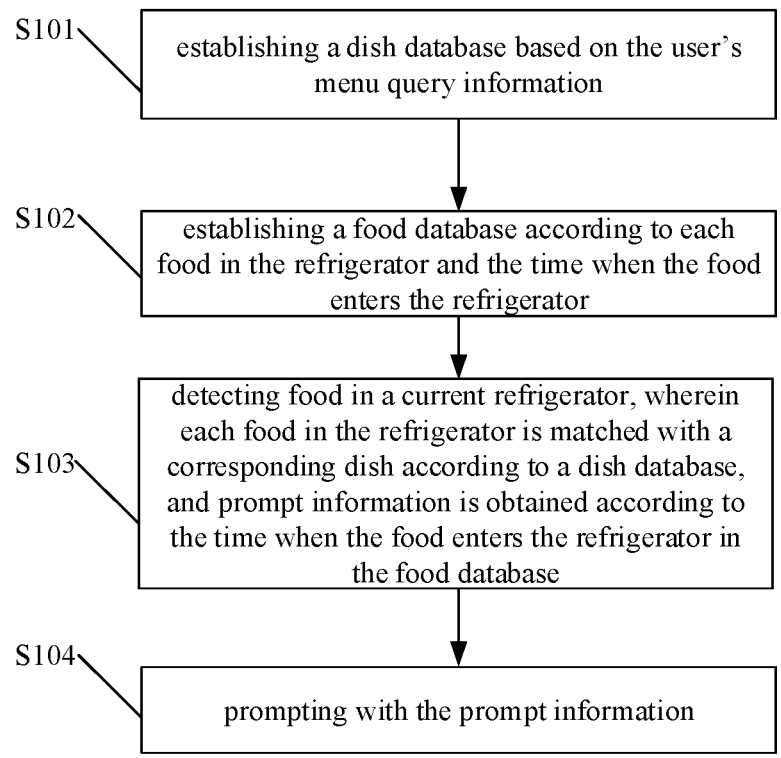
FIG. 1 is a flowchart of a prompt method for a refrigerator provided by an embodiment of the disclosure.

In order that the manner in which the features and techniques of the embodiments of the disclosure can be understood in detail, a more particular description of the implementations of the embodiments of the disclosure will be rendered by reference to the appended drawings, which are included by way of illustration only and are not intended to limit the embodiments of the disclosure. In the following technical description, for purposes of explanation, numerous details are set forth in order to provide a thorough understanding of the disclosed embodiments. However, one or more embodiments may be practiced without these specific details. In other instances, well-known structures and devices may be shown simplified in order to simplify the drawing.

The embodiment of the present application provides a prompt method for a refrigerator, which is shown in FIG. 1 and comprises the following steps:

step S101, establishing a dish database according to the menu query information of the user, wherein the dish database comprises dishes and foods corresponding to the dishes;

step S102, establishing a food database according to each food in the refrigerator and the time when the food enters the refrigerator;

step S103, detecting food in the current refrigerator, wherein each food in the refrigerator is matched with a corresponding dish according to a dish database, and prompt information is obtained according to the time when the food enters the refrigerator in the food database; and step S104, prompting with the prompt information; the prompt information includes expected expiration times and recommended dishes.

In some embodiments, establishing a dish database based on the user's menu query information includes:

acquiring menu inquiry information of a user through a display screen of the refrigerator, displaying corresponding dishes, displaying the dishes corresponding to the selection instruction and recording the dishes and foods corresponding to the dishes after the selection instruction of the user is acquired.

In some embodiments, a food database is established based on each food in the refrigerator and the time the food enters the refrigerator, including:

after monitoring that the refrigerator sequentially passes through a door closing state, a door opening state and a door closing state, reading an electronic tag arranged on food and recording corresponding reading time, wherein the reading time is the time when the food enters the refrigerator, and the electronic tag comprises name, type, production date and shelf life of the food.

In some embodiments, detecting food within a current refrigerator includes:

radio frequency identification of food in the refrigerator.

In some embodiments, each food in the refrigerator matches a corresponding dish according to a dish database, including:

matching the detected food with a dish database to obtain all dishes containing the food.

In some embodiments, the prompt information is obtained based on the time the food enters the refrigerator in the food database, including:

calculating $E_i=B_i-J_i-a$ to obtain the expected expiration time when the food is non-packaged food, and calculating $E_i=B_i-S_i$ to obtain the expected expiration time when the food is packaged food;

obtaining the time when the corresponding food is in the refrigerator according to the time when the food enters the refrigerator;

wherein $E_i$ is the expected expiration time, $B_i$ is the shelf life, $J_i$ is the time the food is in the refrigerator, a is the type reference time, and $S_i$ is the production date, $a>0$, $i>0$.

In some embodiments, when the food is a non-packaged food, the food is affected by the storage environment of the refrigerator, and the number of times the door is opened and closed results in a change in the expected expiration time, i.e., a type reference time, different food type reference times, e.g., a cake type reference time of 0.5 days, a pork type reference time of 1 day, and a fresh vegetable type reference time of 1 day.

In some embodiments, the unpackaged fresh vegetable has a shelf life of 5 days, the food is in the freezer for 2 days, and the type reference time is 1 day, i.e., the expected expiration time is 2 days.

In some embodiments, the food bread is packaged with a shelf life of 7 days and the time the food is in the freezer is 1, i.e., the expected expiration time is 6 days.

In some embodiments, the prompt information is obtained based on the time the food enters the refrigerator in the food database, including:

obtaining recommended dishes according to the display times of the dishes corresponding to the selection instruction.

In some embodiments, prompting with the prompt information includes:

sending the prompt information to the user terminal, or displaying the prompt information on a display screen of the refrigerator when the expected expiration time $E_i$ is less than or equal to the set threshold value.

In some embodiments, the threshold is set to 1 day, and when the expected expiration time is less than or equal to 1 day, prompt information is sent to the user terminal or displayed on the refrigerator display screen.

In some embodiments, the user terminal is a cell phone or a smart watch.

In some embodiments, the shelf life of the food is judged according to the storage environment inside the refrigerator, in general, various foods inside the refrigerator can influence the quality mutually, so that the shelf life is shortened, the shelf life of the food is updated in real time according to the storage environment inside the refrigerator, prompt information is sent out before the food expires the shelf life, the food is timely processed before the food expires, and a user is prevented from mistakenly eating the deteriorated food.

In some embodiments, the prompt information further includes a prompt that the shelf life of the food product has expired.

In some embodiments, when the shelf life of the food has expired is prompted in the prompt information, and the prompt information also comprises a prompt for prompting a user to clean or disinfect the refrigerator, since the expired food can generate many bacteria, the user is prompted to clean and disinfect the expired food in time, the storage environment of the refrigerator can be cleaner and more sanitary, and the prompt content of the refrigerator is increased, and the prompt function of the refrigerator is improved.

According to the prompt method for the refrigerator provided by the embodiment of the present application, it can be seen that by the prompt method for the refrigerator provided by the embodiment of the present application, a dish database can be established based on the menu query information of the user, the hobbies and habits of the user on dishes can be known, a food database is established based on each food in the refrigerator and the time when the food enters the refrigerator, the food in the refrigerator is monitored in real time, and prompt information of the expected expiration time and recommended dishes is sent to a user, the food is monitored, the storage time is recorded, the user is reminded before the shelf life is expired, and the menu is pushed, so that the time for storing the food in the refrigerator cannot be wasted due to the fact that the shelf life of the food is expired too long, the refrigerator is more intelligent, and more comfortable experience is brought to the user.

Figure 2:
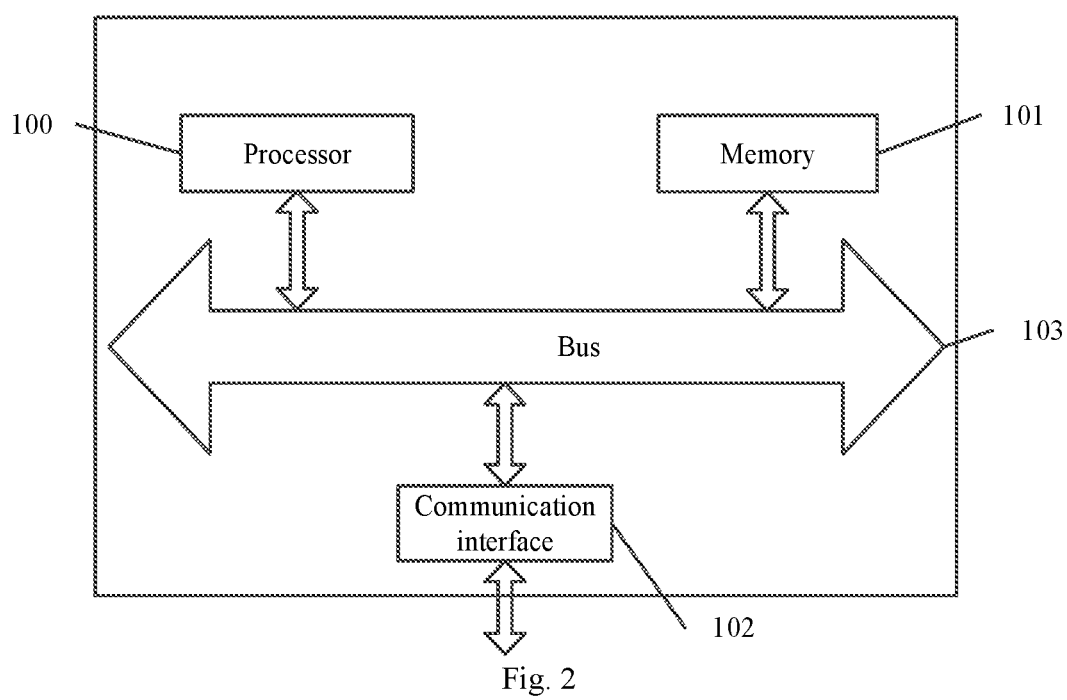
FIG. 2 is a schematic diagram of a prompt device for a refrigerator provided by an embodiment of the disclosure.

The embodiment of the disclosure provides a prompt device for a refrigerator, which is structured as shown in FIG. 2 and includes a processor 100 and a memory 101 storing program instructions, and may further include a communication interface 102 and a bus 103. Among other things, the processor 100, the communication interface 102, and the memory 101 may communicate with each other via a bus 103. Communication interface 102 may be used for information transfer. The processor 100 may invoke program instructions in the memory 101, the processor being configured to execute the prompt method for the refrigerator of the above-described embodiment when executing the program instructions.

Furthermore, the logic instructions in the memory 101 described above may be implemented in the form of software functional units and stored in a computer-readable storage medium when sold or used as a stand-alone product.

The memory 101 serves as a computer-readable storage medium for storing software programs, computer-executable programs, program instructions/modules corresponding to the methods in the disclosed embodiments. The processor 100 executes functional applications and data processing by running software programs, instructions and modules stored in the memory 101, i.e., implements the prompt method for the refrigerator in the above-described method embodiment.

The memory 101 may include a storage program area and a storage data area, wherein the storage program area may store an operating system, an application program required for at least one function; the storage data area may store data or the like created according to the use of the mobile terminal. In addition, memory 101 may include high speed random access memory, and may also include non-volatile memory.

According to the prompt device for the refrigerator provided by the embodiment of the present application, it can be seen that by the prompt device for the refrigerator provided by the embodiment of the present application, a dish database can be established based on the menu query information of the user, the hobbies and habits of the user on dishes can be known, a food database is established based on each food in the refrigerator and the time when the food enters the refrigerator, the food in the refrigerator is monitored in real time, and prompt information of the expected expiration time and recommended dishes is sent to a user, the food is monitored, the storage time is recorded, the user is reminded before the shelf life is expired, and the menu is pushed, so that the time for storing the food in the refrigerator cannot be wasted due to the fact that the shelf life of the food is expired too long, the refrigerator is more intelligent, and more comfortable experience is brought to the user.

The embodiment of the disclosure provides a refrigerator, which comprises the prompt device for the refrigerator. According to the refrigerator, the dish database established based on the menu inquiry information of the user can be used for knowing the hobbies and habits of the user on dishes, the food database is established based on each food in the refrigerator and the time when the food enters the refrigerator, the food in the refrigerator is monitored in real time, the predicted expiration time and the prompt information for recommending the dishes are sent to the user in time, and the food is monitored, the storage time is recorded, the user is reminded before the shelf life is expired, and the menu is pushed, so that the time for storing the food in the refrigerator cannot be wasted due to the fact that the shelf life is expired too long, the refrigerator is more intelligent, and more comfortable experience is brought to the user.

Embodiments of the disclosure provide a computer-readable storage medium storing computer-executable instructions configured to carry out the above-described prompt method for a refrigerator.

Embodiments of the disclosure provide a computer program product comprising a computer program stored on a computer-readable storage medium, the computer program comprising program instructions which, when executed by a computer, cause the computer to carry out the above-described prompt method for a refrigerator.

The computer readable storage medium may be a transient computer readable storage medium or a non-transient computer readable storage medium.

The aspects of the disclosed embodiments may be embodied in the form of a software product stored in a storage medium including one or more instructions for causing a computer device (which may be a personal computer, server, network device, etc.) to carry out all or part of the steps of the methods of the disclosed embodiments. The storage medium can be a non-transient storage medium, and comprises: a variety of media, such as a U-disk, a removable hard disk, a read-only memory (ROM), a random access memory (RAM), a magnetic or optical disk, can store program codes, or can be transient storage media.

The foregoing description and drawings illustrate embodiments of the disclosure sufficiently to enable a person skilled in the art to practice them. Other embodiments may include structural, logical, electrical, procedural, and other changes. The examples merely represent possible variations. Individual components and functions are optional unless explicitly required, and the order of operation may vary. Portions and features of some embodiments may be included in or substituted for those of other embodiments. The scope of the disclosed embodiments includes the full scope of the claims, and all available equivalents thereof. As used in this application, although the terms "first", "second", and the like may be used in this application to describe various elements, these elements should not be limited by these terms. These terms are only used to distinguish one element from another. For example, a first element may be referred to as a second element without changing the meaning of the description, and likewise, a second element may be referred to as a first element, so long as all occurrences of the "first element" are consistently renamed and all occurrences of the "second element" are consistently renamed. The first element and the second element are both elements, but may not be identical elements. Also, the words used in the present application are used for describing the embodiments only and are not intended to limit the claims. As used in the description of the embodiments and the claims, the singular forms "a, an", and "the" are intended to include the plural forms as well, unless the context clearly dictates otherwise. Similarly, the term "and/or" as used in this application is meant to encompass any and all possible combinations of one or more of the associated lists. Additionally, the terms "comprise" and variations thereof, "comprises" and/or "comprising", when used in this application, refer to the presence of stated features, integers, steps, operations, elements, and/or components, but do not preclude the presence or addition of one or more other features, integers, steps, operations, elements, components and/or groups thereof. An element defined by the phrase "comprises a . . . " does not, without more constraints, preclude the existence of additional identical elements in the process, method, or apparatus that comprises the element. In this application, it is emphasized that each embodiment may differ from the other embodiments by the same reference numerals as in the respective embodiments. For methods, products, and the like disclosed in the examples, if they correspond to the method disclosed in the examples, reference may be made to the description of the method in connection therewith.

A person skilled in the art will appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the particular implementation. A person skilled in the art may implement the described functionality in varying ways for each particular application, but such implementation decisions should not be interpreted as going beyond the scope of the disclosed embodiments. It will be apparent to a person skilled in the art that for convenience and brevity of description, reference may be made to corresponding processes in the foregoing method embodiments for specific operation of the systems, apparatus and units described above, which will not be described in detail herein.

In the embodiments disclosed herein, the disclosed methods, articles of manufacture (including, but not limited to, devices, apparatus, etc.) may be implemented in other ways. For example, the device embodiments described above are merely illustrative, e.g., partitioning of elements may be partitioning of only one logical function, there may be additional partitioning in an actual implementation, e.g., multiple elements or components may be combined or integrated into another system, or some features may be omitted, or not carried out. Additionally, the couplings or direct couplings or communicative connections shown or discussed with respect to one another may be indirect couplings or communicative connections through some interface, device or unit, and may be electrical, mechanical and the like. The elements illustrated as separate elements may or may not be physically separate, and the elements illustrated as elements may or may not be physical elements, i.e., may be located one place, or may be distributed across multiple network elements. Some or all of the elements may be selected according to actual needs to implement the present embodiment. In addition, the functional units in the embodiments of the disclosure may be integrated in one processing unit, may be separate physical units, or may be integrated in one unit with two or more units.

The flowcharts and block diagrams in the drawings illustrate the architecture, functionality, and operation of possible implementations of systems, methods, and computer program products in accordance with embodiments of the disclosure. In this regard, each block in the flowchart or block diagram block may represent a module, segment, or portion of code, which comprises one or more executable instructions for implementing the specified logical functions. In some alternative implementations, the functions noted in the blocks may occur out of the order noted in the figures. For example, two successive blocks may in fact be executed substantially in parallel, and they may sometimes be executed in the reverse order, depending upon the functionality involved. In the description of the flowcharts and block diagrams in the drawings, the operations or steps corresponding to different blocks may also occur in a different order from that disclosed in the description, sometimes without a particular order between the different operations or steps. For example, two successive operations or steps may in fact be carried out substantially in parallel, and they may sometimes be carried out in the reverse order, depending on the functionality involved. Each block of the block diagrams and/or flowchart illustrations, and combinations of blocks in the block diagrams and/or flowchart illustrations, can be implemented by special purpose hardware-based systems which carry out the specified functions or acts, or combinations of special purpose hardware and computer instructions.

What is claimed is:

1. A method for a refrigerator comprising a prompt device comprising a processor and a memory storing program instructions, wherein the processor is configured to execute the method comprising the following steps:

establishing a dish database according to menu query information of a user, wherein the dish database comprises dishes and foods corresponding to the dishes;

monitoring that the refrigerator sequentially passes through a door closing state, a door opening state and a door closing state;

reading an electronic tag arranged on food and recording corresponding reading time, wherein the reading time is a time when the food enters the refrigerator, and the electronic tag comprises name, type, production date and shelf life of the food;

establishing a food database according to each food in the refrigerator and the time when the food enters the refrigerator;

detecting food in a current refrigerator, wherein each food in the refrigerator is matched with a corresponding dish according to a dish database, and prompt information is obtained according to the time when the food enters the refrigerator in the food database; and prompting with the prompt information on the prompt device; the prompt information includes an expected expiration time and recommended dishes;

wherein the prompt information is obtained by the refrigerator according to the time when the food enters the refrigerator in the food database;

wherein the method further comprises:

calculating $E_i = B_i - J_i - a$ to obtain the expected expiration time when the food is non-packaged food, and calculating $E_i = B_i - S_i$ to obtain the expected expiration time when the food is packaged food;

obtaining the time when the corresponding food is in the refrigerator according to the time when the food enters the refrigerator by the refrigerator; and displaying the prompt information on a display screen of the refrigerator when the expected expiration time $E_i$ is less than or equal to the set threshold value;

wherein $E_i$ is the expected expiration time, $B_i$ is a shelf life, $J_i$ is a time the food is in the refrigerator, a is a type reference time, and $S_i$ is a production date, $a>0$, $i>0$;

wherein when the food is the non-packaged food, a number of times a door is opened and closed results in a change in the type reference time.

2. The method according to claim 1, wherein a dish database is established according to the user's menu query information, the method further comprises:

acquiring menu inquiry information of a user through the display screen of the refrigerator, displaying corresponding dishes, displaying the dishes corresponding to a selection instruction and recording the dishes and foods corresponding to the dishes after the selection instruction of the user is acquired.

3. The method according to claim 2, wherein the food database is established according to each food in the refrigerator and the time when the food enters the refrigerator.

4. The method according to claim 3, wherein the detecting food in a current refrigerator comprises:

identifying food inside the refrigerator by utilizing radio frequency.

5. The method according to claim 4, wherein each food in the refrigerator matches a corresponding dish according to a dish database, the method further comprises:

matching the detected food with a dish database to obtain all dishes containing the food.

6. The method according to claim 2, wherein the prompt information is obtained according to the time when the food enters the refrigerator in the food database, the method further comprises:

obtaining recommended dishes according to the display times of the dishes corresponding to the selection instruction.

7. The method of claim 6, wherein the prompt information is prompted, the method further comprises:
sending the prompt information to a user terminal when the expected expiration time $E_i$ is less than or equal to the set threshold value.

8. A refrigerator, comprising:
a prompt device comprising a processor and a memory storing program instructions, wherein the processor is configured to execute a method comprising:
establishing a dish database according to menu query information of a user, wherein the dish database comprises dishes and foods corresponding to the dishes;
monitoring that the refrigerator sequentially passes through a door closing state, a door opening state and a door closing state;
reading an electronic tag arranged on food and recording corresponding reading time, wherein the reading time is a time when the food enters the refrigerator, and the electronic tag comprises name, type, production date and shelf life of the food;
establishing a food database according to each food in the refrigerator and the time when the food enters the refrigerator;
detecting food in a current refrigerator, wherein each food in the refrigerator is matched with a corresponding dish according to a dish database, and prompt information is obtained according to the time when the food enters the refrigerator in the food database; and
prompting with the prompt information on the prompt device; the prompt information includes an expected expiration time and recommended dishes;
wherein the prompt information is obtained by the refrigerator according to the time when the food enters the refrigerator in the food database;
wherein the method further comprises:
calculating $E_i=B_i-J_i-a$ to obtain the expected expiration time when the food is non-packaged food, and calculating $E_i=B_i-S_i$ to obtain the expected expiration time when the food is packaged food;
obtaining the time when the corresponding food is in the refrigerator according to the time when the food enters the refrigerator by the refrigerator; and
displaying the prompt information on a display screen of the refrigerator when the expected expiration time $E_i$ is less than or equal to the set threshold value;
wherein $E_i$ is the expected expiration time, $B_i$ is a shelf life, $J_i$ is a time the food is in the refrigerator, a is a type reference time, and $S_i$ is a production date, $a>0$, $i>0$;
wherein when the food is the non-packaged food, a number of times a door is opened and closed results in a change in the type reference time.

* * * * *